United States Patent [19]

Pardo

[11] Patent Number: 4,498,695
[45] Date of Patent: Feb. 12, 1985

[54] PRESSURE COOKER LID LATCH AND LOCK

[75] Inventor: Warren A. Pardo, Bel Air, Md.

[73] Assignee: Robert C. Duckett, Baldwin, Md. ; a part interest

[21] Appl. No.: 298,481

[22] Filed: Sep. 1, 1981

[51] Int. Cl.³ .............................................. E05C 5/02
[52] U.S. Cl. .................................. 292/260; 292/115; 292/106; 220/315
[58] Field of Search ............... 292/260, 115, 106, 201, 292/359, 207; 220/315, 314

[56] References Cited

U.S. PATENT DOCUMENTS

| | | | |
|---|---|---|---|
| 1,067,717 | 7/1913 | Campbell | 292/260 |
| 2,134,314 | 10/1938 | O'Donnell | 292/115 |
| 2,176,306 | 10/1939 | Kuss | 220/314 |
| 2,277,874 | 3/1942 | Miller | 292/256.75 |
| 3,543,547 | 12/1970 | Sugiyama | 292/201 X |

Primary Examiner—Richard E. Moore
Attorney, Agent, or Firm—Kenneth E. Darnell

[57] ABSTRACT

A latching mechanism and pressure-operated safety lock for a pressure vessel such as a pressure fryer, the invention positively locks a lid of a pressure fryer over the cooking pot by means of a latch mounted on the distal end of a bar which centrally engages the lid to bias the lid into a pressure-tight relation with upper peripheral edges of the pot. The latch includes a spindle having a hook element formed at the lower end for engaging a catch mounted on the body of the fryer on tightening of the latch by rotation of a hub mounted on the spindle. The hub is provided with radially extending handles which facilitate rotation thereof. A safety lock operated by pressure generated by food cooking within the fryer cooperates with the latch to prevent opening of the lid when pressure of at least a predetermined value exists within the fryer.

40 Claims, 8 Drawing Figures

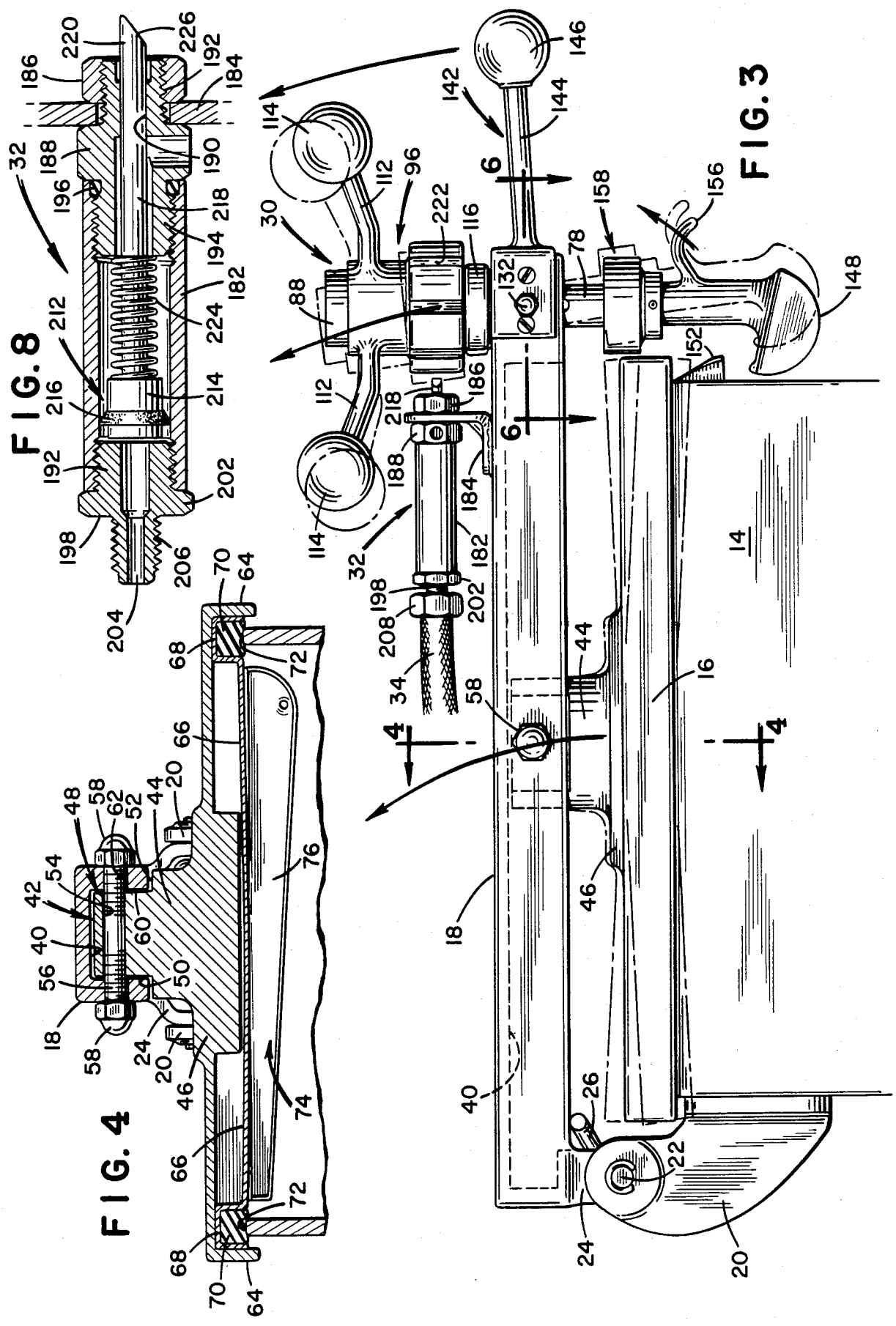

PRESSURE COOKER LID LATCH AND LOCK

BACKGROUND OF THE INVENTION

1. Field of the Invention

The invention relates generally to structures for latching a lid to a pressure vessel and for preventing release of the latching mechanism while certain pressure conditions exist within the vessel. In particular, the invention relates to a manually operable latching mechanism and safety lock useful for opening and closing of the lid of a pressure fryer.

2. Description of the Prior Art

Pressure vessels have long been known to be useful in a wide variety of situations, such vessels invariably including a lid which allows access to the interior of the pressure vessel. Such lids must be sealed on closure of the vessel and positively latched by a mechanism which preferably allows ready opening and closure of the lid with a minimum of effort but with a maximum of safety. A common environment in which pressure vessels are used relates to the cooking of foods under pressure, such devices typically being referred to as pressure cookers or pressure fryers. In this use environment, foods are typically cooked in oil and, under the cooking conditions, moisture in the food is released into the oil as an unavoidable result of the cooking operation, the moisture being prevented from expansion even at the relatively high cooking temperatures by the internal pressure of the cooker. Care must be taken in the design of a pressure cooker to prevent inadvertent and abrupt removal of the pressure cooker lid during and immediately after the cooking operation when the temperature and pressure within the cooker is high. Such an inadvertent opening of the pressure cooker allows immediate expansion of the moisture entrapped in the oil due to the vapor pressure of the moisture, the result being an explosion of the hot oil through the opening normally secured by the lid. An inadvertent and untimely opening of a pressure cooker lid in this manner represents a substantial hazard to an operator of the cooker.

While it is important that the lid of a pressure cooker be secured in a positive manner to prevent accidents, the mechanism employed for securing a lid to a pressure cooker must be capable of ready and rapid operation in both the closing and opening of the lid so that the cooker can be efficiently utilized in commercial cooking operations. While the hazards associated with pressure cookers are recognized and are taken into consideration in the design of latching mechanisms for pressure cooker lids, it is necessary to provide a latching mechanism which is operable by a single individual in a rapid fashion although with due attention to the task, particularly since in a commercial situation the operator is usually also engaged in other tasks in addition to operation of one or more pressure cookers. A particular advantage to an operator of one or more pressure cookers would be the ability to open and close the lid of the cooker with minimum effort consonant with due attention to safety, thereby allowing attention to be also given by the operator to other tasks which are typically associated with cooking of foods in a commercial operation where efficient use of time is absolutely required. In such situations as are commonly encountered in "fast food" cooking operations, it is necessary for an operator of a pressure cooker to read pressure gauges or otherwise make decisions relative to a proper time for opening of a pressure cooker on completion of the cooking cycle. In such situations, it is necessary to provide a locking mechanism which is an added check to the operator's decision to prevent opening of the pressure cooker lid until such time as pressure conditions within the cooker allow safe opening of the cooker. Such a locking mechanism must be reliable and relatively incapable of being fouled and thus rendered inoperable even under the conditions encountered in a commercial cooking operation.

Commercial pressure cookers which are commonly employed are of the type disclosed by Wagner in U.S. Pat. Nos. 3,159,095 and 3,314,416, these pressure cookers being primarily utilized to fry chicken and similar foods which are cooked on the premises by relatively untrained personnel. The pressure fryers disclosed by Wagner include lids which are sealed against a fryer pot opening by means of a pivoted bar which extends over the lid and contacts the lid centrally thereof, a manually operable spindle screw extending through the bar medially of its length and engaging the lid in the vicinity of the contact area between the lid and the bar. These prior art and widely used commercial cooking units also employ a hand-operated lift mechanism disposed at the distal end of the bar for engaging a lug or latch formed in the body of the cooking pot. Accordingly, one operation is required to release the bar from sealing engagement with the lid by means of a screw spindle and a second operation is required to operate the lid to disengage said lift from the catch. The full attention of an operator along with the use of both hands is thus required to operate the essentially separate sealing and latching mechanisms of the pressure fryers disclosed by Wagner. Further, the operator of the Wagner fryers has reliance only on attention to a pressure gauge mounted on the fryer in order to determine when the sealing and latching mechanisms can be operated after completion of the cooking cycle since no locking mechanism is employed to prevent opening of the fryer prior to a sufficient reduction in pressure within the fryer to render safe the opening of the fryer.

Stoermer, in U.S. Pat. No. 3,976,218 improves the pressure fryers of the Wagner patents by provision of a safety interlock which prevents operation of a screw spindle and maintains a closure bar in sealing engagement with the lid of a pressure fryer. The Stoermer safety lock comprises a vertically extending pin which is biased upwardly into an effective engagement with the screw spindle by pressure within the fryer acting against a lid liner, the liner biasing the pin upwardly to prevent rotation of the screw spindle. Since the channel within which the pin is held is vertically disposed with the upper end thereof being essentially open to ambient, fouling of the locking mechanism due to dripping of congealable liquids as well as dropping of solid matter such as breading and the like associated with a cooking operation provides the potential for inadequate operation of the locking structure. Failure of such a safety interlock to operate is hazardous even though the operator of the pressure cooker must primarily rely upon his own personal judgement as to the safety of proceeding with the opening of the pressure cooker.

The present invention intends improvement over the prior art for pressure vessels generally and pressure cookers and fryers particularly in that a latching mechanism is provided which allows ready and rapid opening and closure of the lid of a pressure vessel, the opening and closure operations being readily carried out by a single individual with the use, if desired, of only one hand and essentially with one motion. Further, the invention provides a locking mechanism operable with the latching mechanism to positively prevent opening of a pressure vessel lid while dangerous pressure conditions exist within the vessel. According to the present invention, the locking mechanism is configured to inhibit fouling of the mechanism by congealable liquids and solids such as breading and the like, thereby rendering operation of a pressure vessel such as a pressure cooker or fryer to be safe to a degree not heretofore realized in the art.

SUMMARY OF THE INVENTION

The invention provides a latching mechanism and pressure-operated safety lock for a pressure vessel, particularly a pressure fryer employed principally for cooking chicken or comparable foods in oil under pressure as is well known in the art. The latching mechanism of the invention is disposed at the distal or free end of a bar which extends across a lid of a cooker pot, the lid being adapted to sealingly engage upper edges of the pot. The bar is pivotally connected anteriorly to the cooker pot and is pivotally joined to the lid medially of the length of the bar and essentially centrally of the lid. An elongate spindle is mounted to the free end of the bar and has a hook element at one end thereof which is adapted to engage a catch or lug formed in the pot. Displacement of the spindle in a direction upwardly or outwardly of the lid causes the hook element to engage the catch and to force the lid over the peripheral edges of the pot opening to form a gasket provided about the perimeter thereof to form a seal through engagement with the peripheral edge portions of the pot opening.

Displacement of the spindle in the opposite direction, preferably by means of manually operated radial handles mounted to a hub within which the spindle is threadably engaged, causes the spindle to move downwardly relative to the lid and releases the hook element from the catch, thereby allowing the latching mechanism to be canted to cause the hook element to become free of the catch and thereby to allow the bar and attached lid to be pivoted upwardly to a position allowing access to the interior of the cooker pot.

An adjustment nut and sleeve mechanism is mounted to the spindle near the hook element, the spindle being mounted to the bar at a location thereof between the hub and the adjustment nut and sleeve mechanism. The adjustment sleeve is directly mounted to the body of the spindle and carries the adjustment nut, the nut being threadably mounted on the sleeve to allow displacement of the nut along the longitudinal axis of the adjustment mechanism. Positioning of the adjustment nut on the sleeve allows control of the degree to which the lid can be tightened against the pot opening by rotation of the spindle. The location of the sleeve itself can also be adjusted on the spindle for the same purpose.

The safety locking mechanism of the invention comprises a pin horizontally mounted within a cylindrical receptacle, a first end of the pin extending outwardly of a forward end of the receptacle to engage one of a plurality of radially disposed slots formed in the hub of the latching mechanism, thereby to prevent operation of the latching mechanism to open the lid while the pin is engaged with the hub. The other end of the pin remains within the cylindrical receptacle and has the pressure existing within the pressure cooker exerted thereon to force the pin outwardly of the receptacle when the pressure within the cooking pot is of a sufficiently high value. Pressure is transmitted to the interior of the receptacle to bias the pin outwardly by means of a pressure hose or conduit which communicates with the interior of the cooking pot. The outer end of the pin may be bevelled on one surface to permit the spindle to turn in a lid-closing direction even though the cooker is under pressure. However, the spindle is not permitted by the conformation of the pin to turn in a lid-opening direction while the cooker is under a sufficient pressure to cause engagement of the pin with the hub of the latching mechanism. The safety locking mechanism accordingly prevents opening of the pressure vessel while sufficient pressure exists within the pressure vessel to constitute a hazard in the event of inadvertent opening of the lid.

The present cooperating latching and locking mechanisms are thus seen to be of simple construction and are easily operated by a single operator who need not devote full attention to operation of the mechanisms in order to open and close the lid of a pressure cooker or fryer. Even though the undivided attention of an operator must also be devoted to the task of opening a fryer, the invention allows such a function to occur with safety due to the fact that a decision as to the pressure conditions existing within the cooker made by the operator is subject to a check due to the locking mechanism.

The locking mechanism is further resistant to fouling of its moving parts by materials normally associated with the cooking of large quantities of foods and the unavoidable debris associated therewith. Due further to the inherent simplicity and particular conformation of the present latching mechanism, the latching mechanism is capable of extended operation without the debilitating wear commonly associated with latching mechanisms utilized in virtually all pressure fryers which are commercially available to this time. Accordingly, the present latching mechanism requires substantially less maintenance than presently available sealing and latching structures for pressure fryers, thus representing a substantial savings in time and money for replacement of such sealing and latching mechanisms.

Accordingly, it is a primary object of the present invention to provide a simple, safe and easily operated latching and locking mechanism for operating the lid of a pressure vessel such as a pressure fryer, the present mechanism being resistant to wear and being capable of operation by a single individual with a minimum of physical effort and which prevents opening of a pressure fryer lid when hazardous pressure conditions are present within a pressure fryer or other pressure vessel.

It is another object of the invention to provide a latching mechanism for enabling the sealing of a lid to the pot of a pressure cooker by means of a bar pivotally attached to the cooker and biasing against the lid, the latching mechanism being disposed at the free end of the bar to bias the bar downwardly to seal the lid to the pot and to release the bar from sealing engagement with the lid in order to open the pot, the latching mechanism comprising a spindle which can be displaced as desired to seal or unseal the lid and which includes a hook element for engaging a catch on the pot, the functions of biasing the lid into a sealing relation with the peripheral edges of the opening of the pot and the engagement of the hook element with the catch being readily accomplished by an operator with only one hand if desired due to the fact that all of the structural elements which accomplish these functions comprise an essentially single structural unit.

It is a further object of the invention to provide a locking mechanism for a pressure fryer which cooperates with a latching mechanism to prevent operation of the latching mechanism in a lid-opening sense when hazardous pressure conditions exist within the cooking pot, the locking mechanism comprising a pressure-biased pin disposed in a horizontally-oriented sense and which engages a hub of the associated latching mechanism to prevent operation of the latching mechanism due to direct pressure from the interior of the pot acting on the pin.

Further objects and advantages of the invention will become more readily apparent in light of the following detailed description of the preferred embodiments.

BRIEF DESCRIPTION OF THE DRAWINGS

FIG. 3 is a side elevational view of the latching and locking mechanisms of the invention, the latching and locking mechanisms being shown in a position allowing opening of the lid and the canting of the latching mechanism being shown in phantom to fully disengage a hook element of the latching mechanism from an associated catch formed on the cooking pot of the fryer;

FIG. 4 is an elevational view in section taken along lines 4—4 of FIG. 3;

DESCRIPTION OF THE PREFERRED EMBODIMENTS

Figure 1:
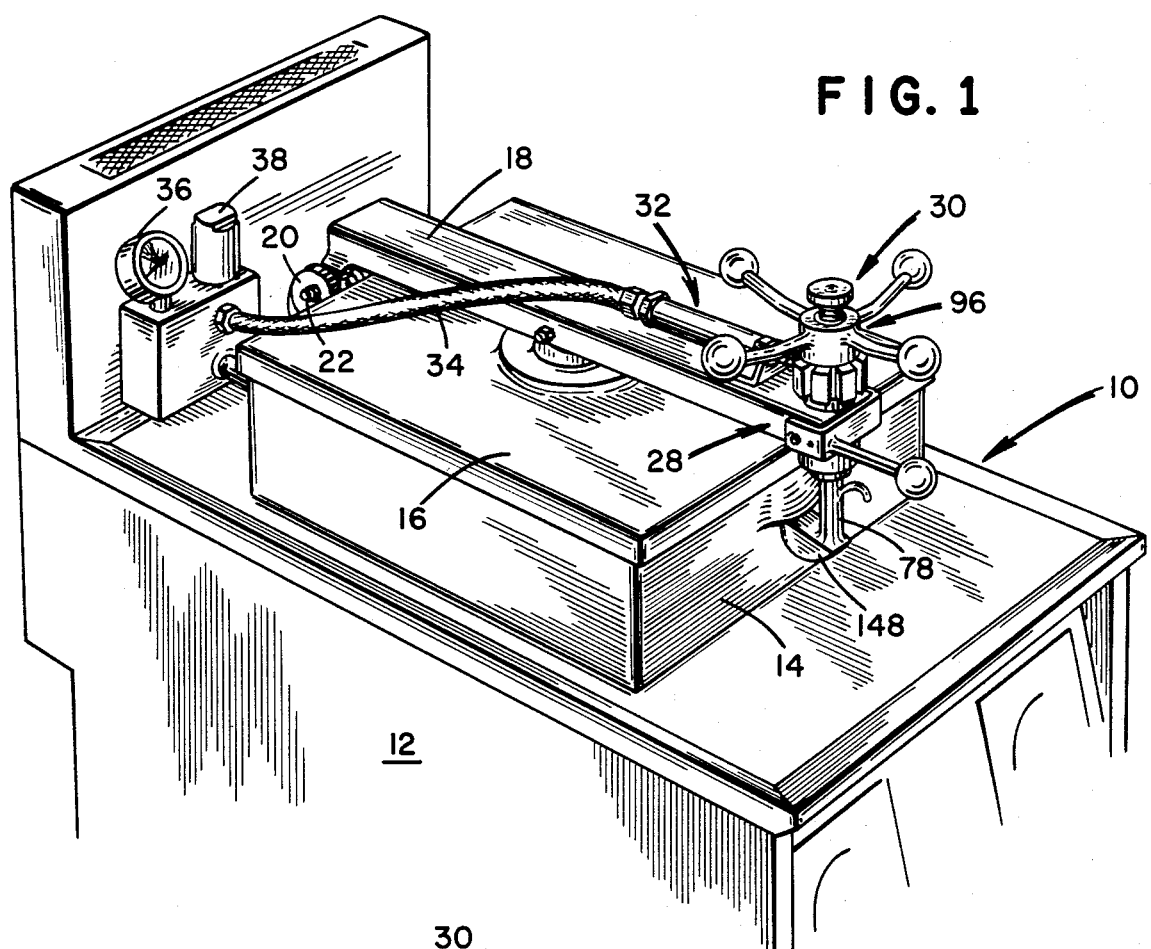
FIG. 1 is a perspective view of a pressure fryer of substantially conventional design which employs the latching and locking mechanisms of the present invention.

Referring now to the drawings and particularly to FIG. 1, a pressure cooker is seen generally at 10, the pressure cooker including a cabinet 12 which mounts a frying pot 14. The cabinet 12 also houses conventional mechanisms such as oil filtration apparatus, control apparatus and the like in a well known fashion. In its essentials other than the latching and locking mechanisms of the present invention, the pressure cooker 10 is conventional in structure and operation. The pressure cooker 10 may use electrical or fossil fuel power for generating cooking temperatures within the frying pot 14. The frying pot 14 is covered by a lid 16 which is sealed against peripheral edges of the frying pot 14 which define the opening closed by the lid 16. A bar 18 is pivotally mounted to a rear exterior wall of the frying pot 14 in a conventional manner by means of a pair of spaced arcuate stanchions 20 and a mounting pin 22 received through the stanchions 20 and through mounting arms 24 extending from the bar 18. A spring 26 is mounted between the stanchions 20 and the bar 18 in a known manner to exert a force upwardly on the bar to cause upwardly pivoting movement of the bar 18 and thus opening of the lid on release of restraints to opening of the lid provided by the latching mechanism of the invention. Mechanisms adequate for the pivotal mounting of the anterior end of the bar 18 to the pressure cooker 10 are conventional in the art and may take forms other than as expressly shown in the drawings.

The bar 18 is further seen to be pivotally mounted to the lid 16 in a manner which will be described in greater detail hereinafter, this pivotal mounting between the bar 18 and lid 16 being substantially located medially of the length of the bar and centrally of the lid. Force necessary to maintain the lid 16 over the frying pot 14 is effectively exerted at this pivotal connection between the lid 16 and bar 18, this force being exerted evenly over the lid 16 to more effectively seal the lid to the pot 14. Although a force acting on the lid 16 is effectively exerted centrally thereof, the force has its genesis at the distal end 28 of the bar 18 and is produced by operation of latching mechanism 30 which functions as a unit to provide the force necessary to seal the lid 16 to the frying pot 14 and to positively latch the bar 18 in a position which maintains the lid 16 in sealed relation over the opening of the frying pot 14. A pressure-operated locking mechanism 32 acts in concert with the latching mechanism 30 to prevent opening of the lid 16 when hazardous pressure conditions exist within the frying pot 14. The locking mechanism 32 is operated by pressure communicated thereto from the interior of the frying pot 14, preferably through a steam line 34 extending from the interior of the frying pot 14 to serve pressure gauge 36 and operating control valve 38. It is to be understood that pressure connection between the locking mechanism 32 and the interior of the frying pot 14 can be made in a variety of ways including direct connection into the frying pot 14 or connection to any steam line brought from the frying pot 14 for any other purpose. The operating control valve 38 can also have a dead weight relief valve (not shown) or other safety valve associated therewith which operates in a conventional manner. A full discussion of the pressure-operated locking mechanism will be provided hereinafter.

Considering now the functioning of the latching mechanism 30, it is first desired to describe the nature of the connection between the bar 18 and the lid 16, this connection being best understood from a consideration of FIGS. 3 and 4. The bar 18 is seen to take the form of a rectangular solid having a cut-out portion at 40 which extends substantially the full length of the bar 18. The cut-out portion 40 acts not only to reduce the weight and cost of the bar 18 but also provides a mating recess within which a plateau portion 42 of a cylindrical mount 44 is received medially of the length of the bar 18. The cylindrical mount 44 may be elevated as shown upon a circular base member 46, the base member 46 and cylindrical mount 44 being welded to the upper surface of the lid 16 substantially centrally of said lid 16. The base member 46 simply acts to facilitate the permanent connection of the cylindrical mount 44 to the lid 16. The cylindrical mount 44 extends perpendicularly to the upper surface of the lid 16 and has chord-like cut-away portions 48 disposed at the upper end thereof and on either side thereof, the vertical, straight walls 50 thus formed on either side of the mount 44 being parallel to each other and parallel to the longitudinal axis of the bar 18. The walls 50 surmount shoulders 52 on either side of the mount 44, the walls 50 and arcuate exterior wall portions of the mount 44 between the walls 50 defining the plateau portion 42 which is received into the cut-out portion or recess at 40. The plateau portion 42 is seen to be provided with an axial bore 54 which has its longitudinal axis disposed perpendicularly to the parallel planar surfaces of the walls 50, the bore 54 receiving a pivot pin 56 therethrough. Opposing walls 60 of the bar 18 are each provided with apertures 62 which align with the bore 54 to also receive the pivot pin 56 therethrough. The pivot pin 56 is threaded at each end to receive nuts 58 thereon to positively mount the bar 18 to the lid 16, this mounting allowing a slight degree of pivotal movement between the lid 16 and bar 18.

While considering FIG. 4, it is to be seen that the lid 16 is provided with peripheral downwardly extending flanges 64, the undersurface of the lid 16 and the peripherally disposed flanges 64 forming a partial enclosure which receives a liner 66 flushly therewithin. The liner 66 is provided about its perimeter with U-shaped channel elements 68, the outer periphery of which abuts against the interior wall surfaces of the flanges 64. Screws or other connecting devices (not shown) are used to secure the liner 66 in position against the undersurface of the lid 16. A flexible gasket 70 of conventional design is disposed within the U-shaped channel element 68 and engages against upper peripheral edges 72 which define opening 74 of the frying pot 14. This engagement of the peripheral edges 72 of the frying pot 14 with the gasket 70 provides the actual contact structure which seals the lid 16 to the opening 74 of the frying pot 14. As is also conventional, a drip catch 76 is provided near the rear of the liner 66 for catching moisture on opening of the pressure cooker 10 and draining the moisture from the cooker in order to prevent random dripping of moisture into the hot oil present in the frying pot 14.

Figure 2:
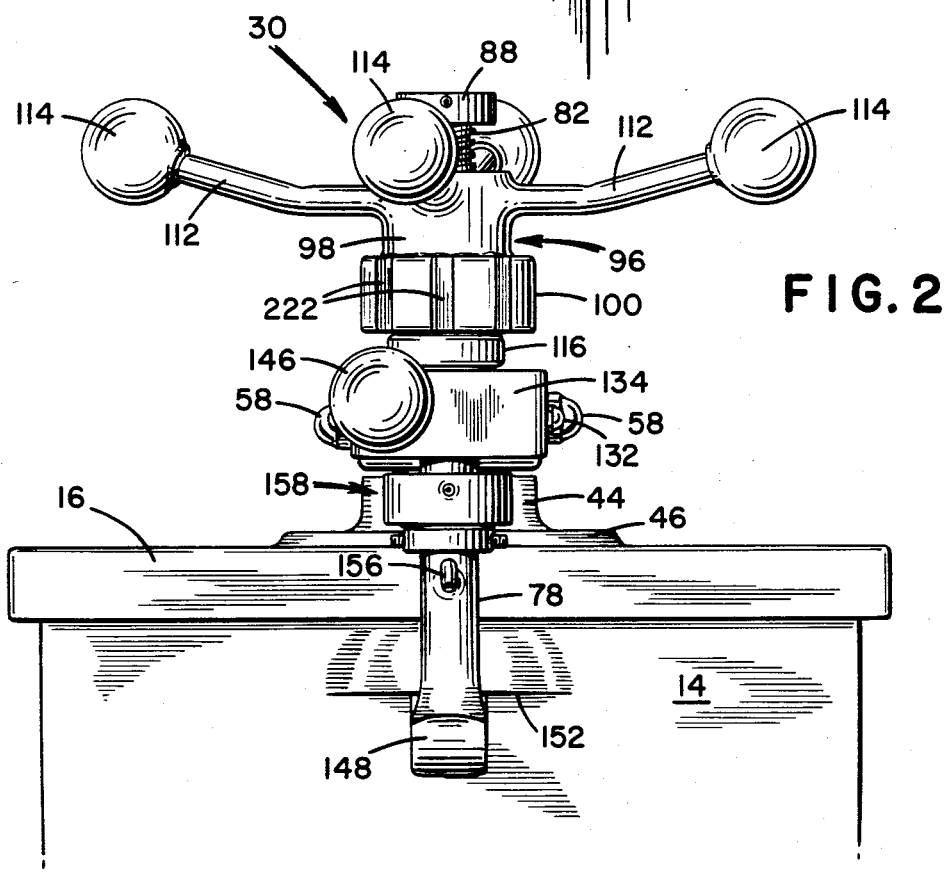
FIG. 2 is a front elevational view of the latching mechanism of the invention, the latching mechanism holding the lid of a pressure fryer in a fully closed configuration.

The sealing function of the gasket 70 in cooperation with the peripheral edges 72 of the frying pot 14 occurs by virtue of the action of the latching mechanism 30 in causing the bar 18 to bias the lid 16 downwardly into tensioned engagement over the opening 74 of the frying pot 14. Thus, the latching mechanism 30 not only acts to latch the lid 16 to the frying pot 14 but also acts to provide the tension which produces the sealing engagement between the gasket 70 and the peripheral edges 72 of the fry pot opening 74. Release of sealing engagement between the lid 16 and frying pot 14 as well as release of the latching function is also provided by the singular structure of the latching mechanism 30. While the latching mechanism 30 can be seen in virtually all of the figures, a full understanding of the structure and operation of the latching mechanism 30 can best be seen by a consideration of FIGS. 1, 2, 3 and 7. In FIGS. 1 and 2, the latching mechanism 30 is shown in a fully latched conformation wherein the lid 16 is caused to be disposed in a fully closed and sealed position. In FIG. 3, the latching mechanism 30 is in the fully unlatched position while in FIG. 7 the mechanism 30 has been rotated to a degree sufficient to allow unlatching. Prior to a discussion of the operation of the latching mechanism 30, the various components of the mechanism 30 will now be described in order that the operation of the mechanism 30 can be more fully appreciated. Referring now particularly to FIGS. 1, 2, 3 and 7, an elongated body member referred to herein as a spindle 78 is seen to be received within a recess 80 (best seen in FIG. 6) and movably mounted therein as will be described hereinafter. The upper portion of the spindle 78 is threaded as seen at 82, this threaded portion extending approximately ⅓ the length of the spindle 78. At the distal end of the threaded portion 82 of the spindle 78, a longitudinal bore 84 extends partially into the spindle 78 and is threaded to receive a threaded bolt 86 which holds a disc-like retainer element 88 to the distal end of the spindle 78. The retainer element 88 is provided with a central aperture 90 having an enlarged outer portion which effectively countersinks the head portion of the bolt 86. An axial bore 92 receives a set screw 94 which acts to lock the retainer element 88 against the bolt 86 to prevent rotation of the retainer element 88 on the bolt 86 as desired. It is to be understood that the function of the retainer element 88 can be provided by structure other than that shown in the drawings since the function is simply to prevent inadvertent removal of certain structural elements of the latching mechanism 30 from the spindle 78. However, it is important for reasons of maintenance and repair to be able to easily remove the retainer element 88 from the spindle 78.

A hub assembly 96 is received on the threaded portion 82 of the spindle 78, the hub assembly 96 comprising an upper hub sleeve 98 and a lower hub 100 which are preferably formed integrally. The lower hub 100 has a central bore 102 extending longitudinally therethrough, the bore 102 being unthreaded and being of a diameter which readily receives the threaded upper portion 82 of the spindle 78 therethrough. The upper hub sleeve 98 has a longitudinal bore 104 formed therethrough which aligns with the bore 102 in the lower hub 100. However, the bore 104 is of a greater diameter than the bore 102 and receives therewithin a threaded liner 106 which is preferably formed of a hardened material such as an Oilite bronze material. Since it is sometimes necessary to remove the threaded liner 106 from the mechanism 30 due to wear, the liner 106 is provided with a keyway 108 which receives a key portion 110 formed integrally with the upper hub sleeve 98 to hold the threaded liner 106 positively within the bore 104 of the upper hub sleeve 98. Rotation of the spindle 78 relative to the hub assembly 96 thereby causes displacement of the spindle 78 relative to said hub assembly 96 by virtue of the action of the threaded upper portion 82 of said spindle 78 and the threaded liner 106 of the hub assembly 96. Given that the hub assembly 96 essentially remains in a stationary position relative to the bar 18, the spindle 78 thus moves along a line perpendicular to the bar 18 and extending through the recess 80 in said bar 18.

Displacement of the spindle 78 as aforesaid is effected by rotation of the hub assembly 96, the rotation of the hub assembly 96 being facilitated by the provision of radial arms 102 which extend from the upper hub sleeve 98 and terminate in round knobs 114. The use of structures such as the arms 112 for facilitating manual rotation of a rotary structural element is well known in the art and need not be described in detail here. For purposes of this invention, the radial arms 112 are preferably seen to extend essentially horizontally from the hub assembly 96 and be bent upwardly therefrom at a location approximately ⅓ the length of said arms 112, thereby facilitating operation of the latching mechanism 30.

Immediately below the hub assembly 96 and immediately above the distal end of the bar 18 about the recess 80, a thrust bearing 116 is carried on the spindle 78, the bearing 116 preferably being of known design and including upper and lower annular raceways 118 holding ball elements 120 therebetween, the bearing assembly being held together by an annular wall ring 122 as particularly seen in FIG. 7. The bearing 16 need not be connected to other portions of the latching mechanism, it being sufficient for the bearing 116 to be loosely carried by the spindle 78 and to ride thereover by virtue of the reception of the spindle 78 through central bore 124 of the bearing 116. The bearing 116 in its interposed position between the hub assembly 96 and the bar 18 facilitates rotation of the hub assembly 96 relative to the bar 18.

Figure 6:
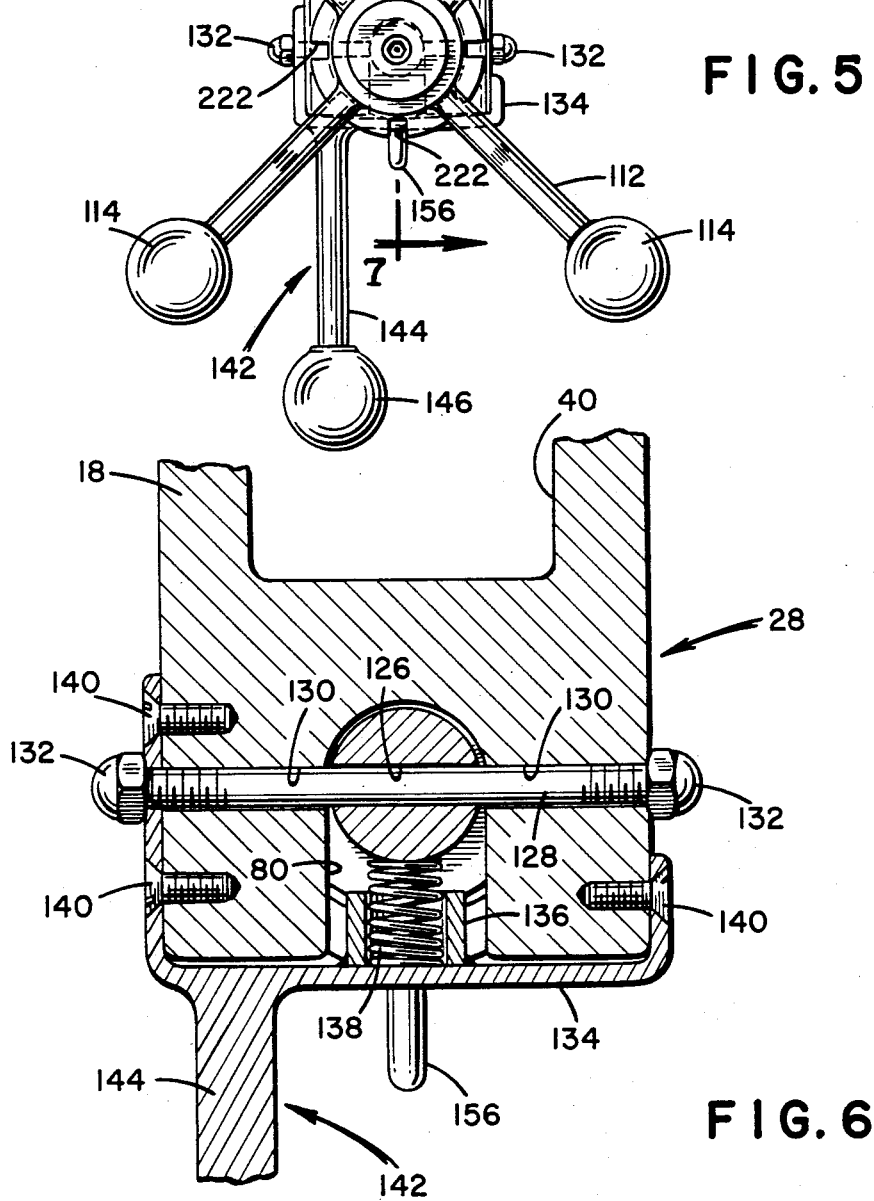
FIG. 6 is a sectional view taken along lines 6—6 of FIG. 3.
Figure 7:
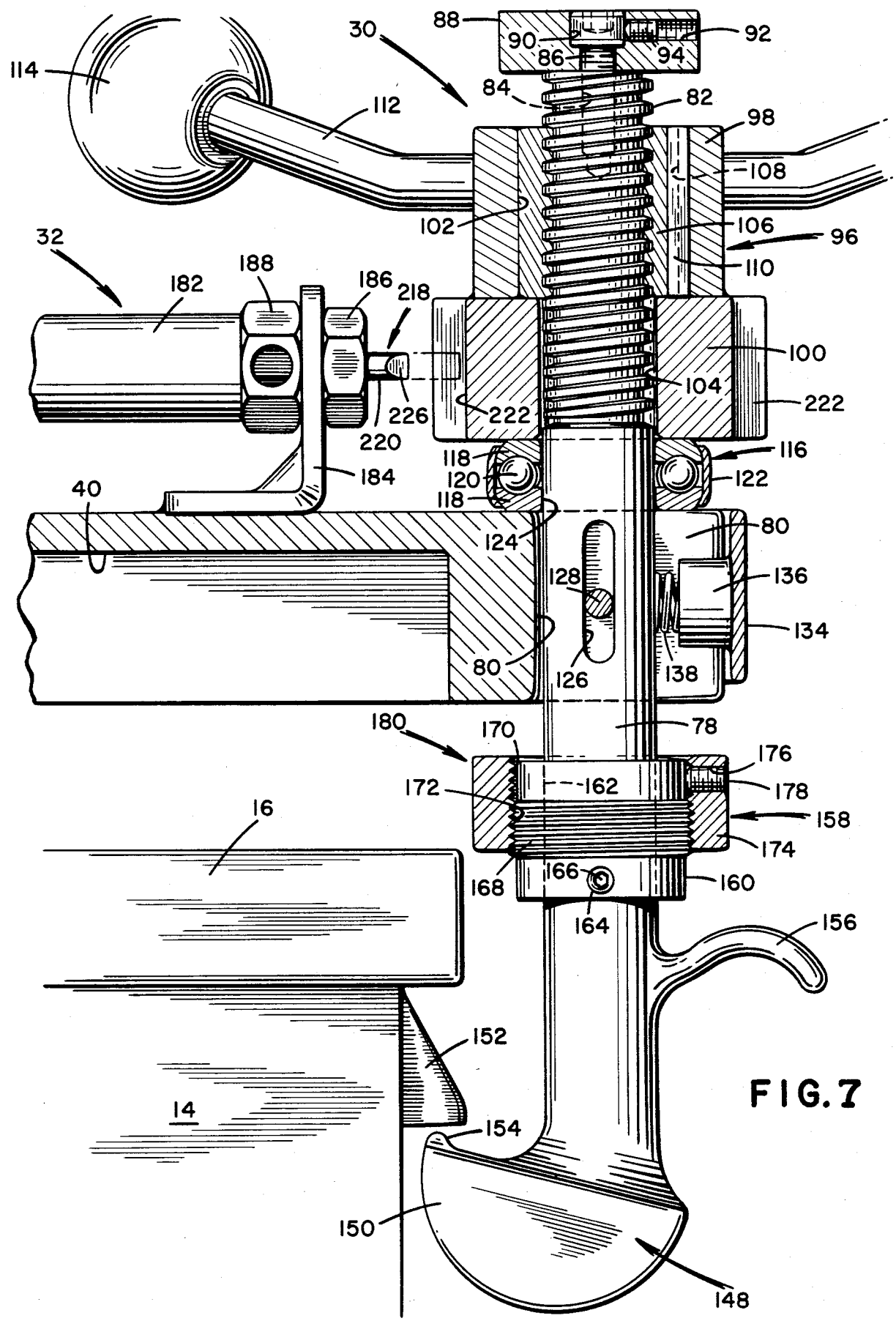
FIG. 7 is an elevational view in partial section taken along lines 7—7 of FIG. 5; and, FIG. 8 is a top or plan view in section of the locking mechanism.

As best seen in FIGS. 6 and 7, the spindle 78 is seen to be provided with a slot 126 which is longitudinally oriented relative to the body of the spindle 78 and which extends therethrough. The slot 126 receives a pin 128 with a longitudinally degree of freedom of the pin 128, thereby allowing displacement of the spindle 78 along its longitudinal axis. The pin 128 is received within aligned bores 130 formed inside walls of the recess 80 of the bar 18, the pin 128 being provided with securing nuts 132 on each end. A retaining cover 134 is fitted about the distal end of the bar 18 and has a hollow cylindrical nub 136 formed on an inner surface thereof, the nub 136 extending into the recess 80 in the bar 18 and housing a spring 138 which extends from said nub 136 into contact with the spindle 78. The spring 138 tensionably acts against the spindle 78 to assist in maintaining said spindle 78 in a desired position within the recess 80. The retaining cover 134 is seen to be held to the distal end of the bar 18 by means of countersunk screws 140, one side of the cover having an aperture formed therein to receive an end of the pin 128 therethrough. The retaining cover 134 also mounts a handle member 142 which is comprised of an elongated rod 144 which terminates in a knob 146, this handle member facilitating lifting of the bar 18 when the latching mechanism 30 is unlatched to allow opening of the pressure cooker 10. It is to be understood that the spindle 78 can be otherwise disposed and retained within the recess 80, it not being absolutely necessary to utilize the pin 128 or the spring 138 or even the retaining cover 134 since the latching mechanism 30 will function when due care is exercised to prevent movement of the spindle 78 from the recess 80. The simple use of a retaining cover such as the cover 134 is adequate to prevent inadvertent movement of the spindle 78 from the recess 80. However, the structure shown and described provides advantages in the operation of the latching mechanism 30 and is now preferred for obtaining the most efficient utilization of the structure provided by the invention.

The lower end of the spindle 78 terminates in a hook-like element 148 having a bight portion 150 which extends when in the latched conformation to engagement with a lug or catch 152 formed on an opposing wall of the frying pot 14. A raised ridge 154 terminates the bight portion 150 and, by virtue of extending into positive engagement with the catch 152, acts to prevent inadvertent slippage of the hook-like element 148 from engagement with the catch 152. At a location above the element 148 and to the side of the spindle opposite the bight portion 150 is disposed a lift element 156 which constitutes an arcuate element adapted to be contacted by the finger or hand of a user to facilitate canting of the latching mechanism 30, as shown in phantom in FIG. 3, thereby to displace the hook-like element 148 outwardly from the catch 152 to facilitate lifting of the bar 18 and lid 16 connected thereto. It is to be noted that the latching mechanism 30 does not cant itself away from a position whereby unexpected pressure within the frying pot 14 would allow full opening of the lid 16. As seen in FIGS. 3 and 7, the latching mechanism 30 must be canted outwardly in order to displace the hook-like element 148 from engagement with the catch 152 on upward movement of the bar 18. Accordingly, on opening of the lid 16 it is necessary for an operator to cant the latching mechanism 30 as shown in FIG. 3 in order to avoid contact between the hook-like element 148 and the catch 152 even when the spindle 78 is in the fully downwardly displaced position. This necessity for canting the latching mechanism 30 also provides a safety function in the event that unexpected pressure within the frying pot 14 may cause inadvertent opening of the lid 16, the ability of the hook-like element 148 to thus engage the catch 152 after only a short movement having the capability to prevent injury to an operator by the full opening of the lid 16 in an unexpected and hazardous manner.

The operation of latching and sealing the lid 16 to the frying pot 14 involves manual pivoting of the bar 18 and lid 16 mounted thereto over the opening 74 of the frying pot 14. This closure is accomplished while the spindle 78 is in the "open" disposition as seen in FIG. 3 or in FIG. 7, that is, with the threaded upper portion 82 of the spindle 78 either fully threaded downwardly through the hub assembly 96 or essentially so. The closure of the lid 16 over the opening 74 thus described causes the hook-like element 148 to become disposed immediately below the catch 152 as shown in FIG. 7. Rotation of the hub assembly 96 in a clockwise direction by manual grasping of the radial arms 112 and rotation thereof causes the spindle 78 to move in an upward direction by virtue of the mating threads on the portion 82 of the spindle and in the threaded liner 106 of the hub assembly 96. Once the hook-like element 148 at the lower end of the spindle 78 is engaged with the catch 152 to latch the lid 16 in place, the hub assembly 96 can be further rotated in order to tighten the lid 16 over the opening 74 of the frying pot 14, thereby to seal the opening 74 as aforesaid. The force exerted against the distal end of the bar 18 by virtue of rotation of the hub assembly 96 to bias the bar 18 downwardly allows closure of the lid 16 to a desired degree of tension for sealing of the lid 16 over the frying pot 14. It can be appreciated that the latching mechanism 30 can by overly tightened with resultant damage to the gasket 70 inter alia. Accordingly, an adjustment assembly 158 is carried on the spindle 78 at a preferred location below the distal end of the bar 18 and above the lift element 156. The adjustment assembly 158 includes an adjustment sleeve 160 having a longitudinal bore 162 formed therethrough which is of a size to receive the spindle 78 therethrough. The adjustment sleeve 160 is provided with an axially extending bore 164 on one side thereof to receive a locking screw 166 therethrough, thereby to positively position the adjustment sleeve 160 at a desired location on the body of the spindle 78. The adjustment sleeve 160 further has a medial threaded portion 168 disposed on the outer surface thereof. This threaded portion 168 mates with threads 170 formed in a bore 172 of an adjustment nut 174 which is carried on the adjustment sleeve 160. Due to the mating of the threads 170 with the threaded portion 168, the adjustment nut 174 can be displaced longitudinally of the body of the spindle 78.

An axial bore 176 formed in the adjustment nut 174 receives a locking screw 178 to positively lock the adjustment nut 174 into a desired relation with the adjustment sleeve 160. The adjustment assembly 158 is thus positioned on the spindle 78 by means of the locking screw 166 while the adjustment nut 174 is positioned on the adjustment sleeve 160 by means of the locking screw 178. Accordingly, upper surface portions 180 can be positioned along the lower end of the spindle 78 by means of two locking mechanisms, fine and gross adjustment being thereby provided of the position of the surface portions 180. The surface portions 180 provide a stop against which the lower and opposing surfaces of the distal end of the bar 18 can abut. Accordingly, once the hub assembly 96 has been rotated in order to seal the lid 16 over the opening 74 of the frying pot 14, the adjustment assembly 158 inhibits further rotation of the hub assembly 96 and indicates to an operator that the lid 16 is latched and properly sealed with the proper amount of pressure being applied to the lid 16 through the latching mechanism 30. As sometimes occurs after extended use of the pressure cooker 10, the gasket 70 becomes worn and exhibits a reduced ability to maintain pressure within the frying pot 14. Under such conditions, the adjustment assembly 158 can be adjusted by lowering of the full assembly through manipulation of the locking screw 166 or by lowering of the adjustment nut 174 by release of the locking screw 178 and rotation of the nut 174 relative to the sleeve 160. In either situation, the upper surface portions 180 of the adjustment nut 174 are effectively lowered with respect to the body of the spindle 78 and allows additional tightening of the latching mechanism 30 to increase the pressure of the gasket 70 against the peripheral edges 72 of the frying pot 14.

Referring particularly to FIGS. 1 and 2, the latching mechanism 30 can be seen in the fully "closed" position wherein the lid 16 is fully latched and sealed over the opening 74 of the frying pot 14. In this conformation, at least a portion of the threaded upper portion 82 of the spindle 78 extends above the hub assembly 96. Further, the adjustment assembly 158 in the "closed" conformation is disposed immediately below the bar 18 or in abutting contact therewith. It is to be understood that the latching mechanism can fully latch and seal the lid 16 without actual physical abutment between the bar 18 and the adjustment assembly 158. The adjustment assembly 158 serves as a desired limitation on the rotation of the hub assembly 96 rather than as a structural element which must contact other structural portions of the mechanism in order to guarantee operation thereof. It is thus understood that the adjustment assembly 158 is not absolutely necessary to a proper operation of the latching mechanism 30 but is preferred in use to facilitate such operation by relatively unskilled operators of the pressure cooker 10 who may not be able to devote adequate attention to a proper closure of the lid 16 over the frying pot 14.

Opening of the lid 16 is readily accomplished by counter-clockwise rotation of the hub assembly 96 through manual grasping of the radial arms 114 as is easily understood from a casual review of the drawings. The hub assembly 96 on opening of the lid 16 is rotated a sufficient number of times to cause downward displacement of the spindle 78 to a position such as is shown in FIG. 3 or FIG. 7, thereby to cause the hook-like element 148 to be disengaged from the catch 152. On disengagement from the catch 152, the locking mechanism is canted as aforesaid, preferably by grasping the lift element 156 and exerting an upward and outward motion. The bar 18 can most readily be pivoted about its anterior end by manual grasping of the handle member 142 and exerting an upward motion which raises the bar 18 and the lid 16 connected thereto, this motion being assisted by the spring 26 as aforesaid.

Prior to opening of the lid 16 after completion of a cooking cycle, it is necessary to insure that excessive pressure does not exist within the frying pot 14, opening of the lid 16 prior to diminution of the pressure within the pot 14 being potentially hazardous as is well known in the art. The operator must assume responsibility for reading the pressure gauge 36 in order to determine whether the opening of the lid on a pressure cooker is safe, even when a large number of cookers are being operated such as in a "fast food" commercial operation. However, it is considered necessary as a back-up to the operator's decisions to provide the locking mechanism 32 of the invention which functions in association with the latching mechanism 30 to prevent opening of the lid 16 when hazardous pressure conditions exist within the frying pot 14. The locking mehanism 32 can particularly be seen in FIGS. 3, 5, 7 and 8 to comprise a cylindrical housing 182 fixed in position on the upper surface of the bar 18 adjacent the latching mechanism 30 by means of an L-shaped mount 184. The housing 182 is affixed to an upwardly extending arm of the mount 184 by means of a threaded nut 186 and a mounting element 188, the mounting element 188 having a longitudinal bore 190 extending therethrough and having threaded cylindrical projections 192 and 194 extending rspectively from the ends of said element 188. The forwardmost projection 192 extends through an aperture formed in the upwardly extending leg of the L-shaped mount 184 from the rearward side thereof, the threaded nut 186 fitting over the threaded projection 192 and, on tightening of the nut 186 thereon, fixing the mounting element 188 in position thereto. The rearmost cylindrical projection 194 is provided with an O-ring seal 196 abutting the central body portion of the mounting element 188 to allow sealing of the cylindrical housing 182 to the mounting element 188. The cylindrical housing 182 is provided at its forward end with internal threads which mate with the threads of the cylindrical projection 194, the housing 182 being thus positively mounted to the element 188 and sealed there against by the O-ring seal 196.

At the rearmost end of the cylindrical housing 182 is disposed a pressure fitting 198 having threads at least on one end which are mated with a threaded central aperture 200 in plate 202 which is fixed to the rearward end of the housing 182. A longitudinal bore 204 in the pressure fitting 198 allows communication through said fitting 198 with the interior of the housing 182. The pressure fitting 198 is threaded at its outer end to receive a threaded terminal nut 208 which is mounted on the end of the flexible pressure line 34. The pressure line 34 extends to a connection with a live pressure conduit, such as the steam line which conventionally extends from the frying pot 14 to operate ancillary devices such as the pressure gauge 36 or control valve 38 on the pressure cooker 10. It is to be understood that the pressure line 34 can be caused to communicate with the affects of the pressure existing within the frying pot 14 in a wide variety of physical arrangements, it being preferred that the pressure line 34 communicate in a direct fashion with the pressure existing within the pot 14. In any event, the pressure within the pressure line 10 and the pressure thus directed into the cylindrical housing 182 must at least be a determinable function of the pressure existing within the frying pot 14.

Above-ambient pressure exisiting within the frying pot 14 is communicated as aforesaid through the pressure line 34 into the cylindrical housing 182 of the locking mechanism 32, this pressure acting against the rear end of a dowel assembly 212, thereby to force the dowel assembly 212 forwardly within the housing 182 on exertion of a sufficient force thereagainst. The dowel assembly 212 comprises an enlarged cylindrical body portion 214 which is of a diameter slightly reduced from the inner diameter of the cylindrical housing 182. The body portion 214 is capable of sliding movement within the housing 182 and carries an O-ring seal 216, the seal 216 providing a sliding seal between the rear of the dowel assembly 212 and the rear portion of the housing 182 in order to maintain efficient exertion of pressure against the rear portion of the dowel assembly 212. An elongated locking dowel 218 extends longitudinally from the cylindrical body portion 214 of the dowel assembly 212 and through the bore 190 and associated aligned apertures, the distal end 220 of the dowel 218 extending outwardly of the cylindrical housing 182 through the forwardmost cylindrical projection 192 of the mounting element 188. The distal end 220 of the dowel 219 thus extends toward the latching mechanism 30 to engage one of the vertical slots 222 formed regularly in the exterior surface of the lower hub 100 and radially about the periphery thereof. A spring 224 is carried on the dowel 218 and biases against the body portion 214 at one end and against the projection 194 of the mounting element 188 at the other end, the spring 224 acting to return the locking dowel 218 to an unlocked position when pressure is not being exerted gainst the dowel assembly 212 as aforesaid.

As can readily be seen in FIGS. 3 and 7, the distal end 220 of the locking dowel 218 does not extend into engagement with the hub assembly 96 when the latching mechanism 30 is in the unlatched configuration. In this unlatched condition, the locking mechanism 32 does not provide any resistance to operation of the latching mechanism 30, a positive indication that hazardous pressure does not exist within the frying pot 14. However, the generation of a sufficiently high pressure within the frying pot 14 to constitute a hazard causes forward displacement of the dowel assembly 212 within the housing 182 due to pressure transmitted into the housing through the pressure line 210, thereby causing the distal end 220 of the dowel 218 to extend into one of the slots 222 as seen particularly in FIG. 5. When the dowel 218 is thus engaged within one of the slots 222, counterclockwise motion of the hub assembly 96 is thus prevented and an operator of the cooker 10 is thus unable to inadvertently open the frying pot 14 while hazardous pressure conditions exist within the pot 14. The operator must, however, assure himself that the dowel 218 engages in one of the slots 222 rather than simply impinges against the face of the hub 100. After completion of a cooking cycle and dissipation of pressure within the frying pot 14, the pressure exerted against the rear portion of the dowel assembly 212 is sufficiently reduced to allow the spring 224 to displace the dowel assembly 212 and thus the locking dowel 218 rearwardly to allow rotation of the hub assembly 96 and thus to allow opening of the frying pot 14 without hazard.

Figure 5:
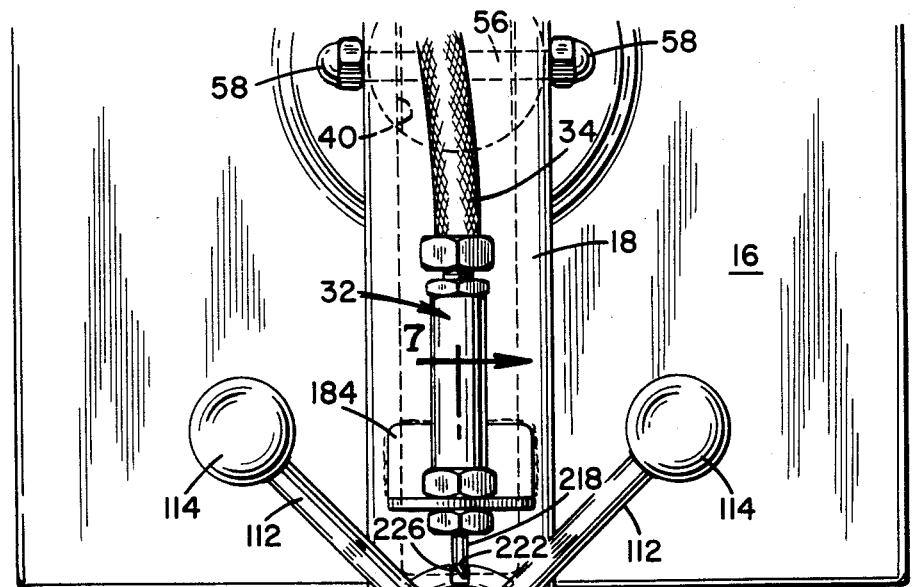
FIG. 5 is a plan view of the present latching and locking mechanisms in a lid-closing configuration wherein pressure within the cooking pot has acted on the locking mechanism to cause a pin to engage a slot within the hub of the latching mechanism, thereby to prevent removal of the lid from the pressure pot opening.

The distal end 222 of the locking dowel 218 can optionally be provided with a bevelled portion 226 on the "left" side thereof as seen in FIG. 5, this bevelled portion 226 facing the edges of the slots 222 as the hub assembly 96 is turned in a clockwise manner to seal the lid 16 to the frying pot 14. This bevelled portion 226 thus allows additional rotation of the hub assembly 96 in the event that further sealing of the lid 16 needs to be effected once the lid is initially latched and sealed and after cooking pressure has built up within the frying pot 14 sufficiently to cause actuation of the locking mechanism 32 and thus engagement of the dowel 218 with one of the slots 222. Even though the hub assembly 96 can thus be rotated in a clockwise manner to further close and seal the lid 16 by virtue of the bevelled portion 226, the hub assembly 96 cannot be rotated in a counter-clockwise manner to open the lid after the dowel 18 has engaged one of the slots 220. When the dowel 218 is provided with a bevelled portion 226, it can be seen that the opposing edge of the slot 222 in which the dowel 218 extends would act on clockwise rotation of the hub assembly to bias the dowel 218 inwardly against the pressure exerted through the pressure line 234, the distal end 220 of the dowel 218 then snapping into the next encountered slot 222 on continued rotation of the hub assembly 96. This procedure can continue as necessary until the lid 16 is adequately sealed to the frying pot 14.

The latching mechanism 30 and the locking mechanism 32 are thus seen to provide simple, inexpensive and wear-resistant structure capable of effective and safe operation to latch, seal and lock a lid 16 over the opening 74 of a frying pot 14 such as is commonly employed in a pressure cooker 10. While the invention has been described in relation to the particular embodiment shown, that is, relative to a use to maintain a lid on a pressure cooker, it is to be understood that the invention can be configured otherwise than as explicitly shown and described herein without departing from the intended scope of the invention and that the structure of the invention can be utilized in use environments other than explicitly shown. In particular, the structure of the present invention can also find utility in pressure vessels generally to secure a lid or hatch cover over an associated opening. Accordingly, the scope of the invention is seen to be defined by the recitations of the appended claims.

What is claimed is:

1. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secured position over the opening of the vessel, a portion of the latching means engaging the catch on the body of the vessel for latching the bar and associated lid over the opening; and, locking means carried by the bar and disposed adjacent to and engageable with the latching means for inhibiting unlatching of the latching means in response to pressure conditions existing within the pressure vessel, at least a portion of the locking means being mounted on the bar for horizontal movement to engage at least a portion of the latching means.

2. The apparatus of claim 1 wherein the latching means further comprise:
- an elongated spindle carried in and extending through a recess in the free end of the bar, the spindle terminating at one end in a hook element constituting the aforesaid portion of the latching means which is adapted to engage the catch on the body of the vessel, the other end of the spindle having a threaded portion; and,
- a hub having a threaded bore extending therethrough and matingly receiving at least a portion of the threaded portion of the spindle therewithin, the hub being rotatable to cause the spindle to be displaced longitudinally within the threaded bore by virtue of the action of the mating threads of the bore and spindle, thereby to displace the hook element relative to the catch to latch or unlatch the bar and associated lid over the opening of the vessel.

3. The apparatus of claim 2 and further comprising means carried on the bar for maintaining the spindle within the recess and for allowing canting motion of the longitudinal axis of the spindle to allow displacement of the hook element away from engagement with the catch on opening of the lid.

4. The apparatus of claim 2 and further comprising bearing means disposed between the hub and the bar for facilitating rotation of the hub.

5. The apparatus of claim 2 and further comprising retaining means disposed on the end of the threaded portion of the spindle for retaining the hub on the spindle.

6. The apparatus of claim 2 and further comprising adjustment means carried on the spindle along a portion thereof between the bar and the hook element for adjusting the tightening force capable of application to the bar and lid on rotation of the hub.

7. The apparatus of claim 6 wherein the adjustment means comprise:
- an annular sleeve carried on the spindle and movable thereby; and,
- means carried by the sleeve for fastening the sleeve to the spindle in a predetermined location.

8. The apparatus of claim 7 wherein the adjustment means further comprise:
- an annular adjustment nut carried by the sleeve;
- means formed on the nut and on the sleeve for adjusting the position of the nut relative to the sleeve; and,
- means carried by the nut for fastening the nut to the sleeve is a predetermined location.

9. The apparatus of claim 2 and further comprising means carried by the spindle and adapted to be grasped by an operator of the pressure vessel for lifting and canting the spindle.

10. The apparatus of claim 2 and further comprising radial arms extending from the hub and adapted to be grasped by an operator of the pressure vessel to facilitate rotation of the hub.

11. The apparatus of claim 2 wherein the hub is provided with at least one slot in an exterior wall thereof and wherein at least portions of the locking means are disposed adjacent to the hub for inhibiting the rotation of the hub during the existence of hazardous pressure conditions within the pressure vessel, the locking means comprising:
- a pin mounted for horizontal movement to engage a distal end of the pin within the slot to inhibit rotation of the hub; and,
- means engaging an anterior end of the pin for exerting pressure on the pin to displace said pin into engagement with the hub, the pressure exerting means being responsive to pressure conditions existing within the pressure vessel.

12. The apparatus of claim 11 wherein the distal end of the pin is beveled on one side to allow continued rotation of the hub in a direction effecting closure of the lid.

13. The apparatus of claim 11 and further comprising a spring mounted on the pin and engaging surfaces of the locking means to exert a force on the pin to bias the pin away from engagement with the hub on release of pressure exerted on the pin by the last-mentioned means.

14. Apparatus for securing a lid of a pressure vessel over an opening thereof, the pressure vessel having a catch located on the body of the vessel, comprising:
- a bar pivotally connected at a first end to the vessel and engaging the lid at a location along the length of the bar;
- latching means carried on a second, free end of the bar for biasing the bar against the lid to force the lid into a secure position over the opening of the vessel, a portion of the latching means engaging the catch on the body of the vessel for latching the bar and associated lid over the opening; means carried by the latching means for applying tightening force to the bar and lid; and,
- adjustment means carried by the latching means along a portion thereof for adjusting the degree of tightening force which can be applied to the bar and lid by the last mentioned means.

15. The apparatus of claim 14 and further comprising means for mounting the latching means to the bar for canting motion relative to the bar.

16. The apparatus of claim 14 wherein the latching means further comprise:
- an elongated spindle carried in and extending through a recess in the free end of the bar, the spindle terminating at one end in a hook element comprising the catch-engaging portion;
- a hub mounted with the other end of the spindle;
- cooperating means carried by the other end of the spindle and the hub for displacing the spindle and the hook element relative to the catch to latch or unlatch the bar and associated lid over the opening of the vessel.

17. The apparatus of claim 16 wherein the adjustment means comprise:
- an annular sleeve carried by the spindle and movable thereby; and,
- means carried by the sleeve for fastening the sleeve to the spindle in a predetermined location.

18. The apparatus of claim 17 wherein the adjustment means further comprise:
- an annular adjustment nut carried by the sleeve;
- means formed on the nut and on the sleeve for adjusting the position of the nut relative to the sleeve; and,
- means carried by the nut for fastening the nut to the sleeve in a predetermined location.

19. Apparatus for securing a lid of a pressure vessel over an opening thereof, the pressure vessel having a catch located on the body of the vessel, comprising:

a bar pivotally connected at a first end to the vessel and engaging the lid at a location along the length of the bar; and, latching means carried on a second, free end of the bar for biasing the bar against the lid to force the lid into a secured position over the opening of the vessel, the latching means being capable of a canting motion relative to the bar, the latching means comprising an elongated spindle carried in and extending through a recess in the free end of the bar, the spindle terminating at one end in a hook element which is adapted to engage the catch on the body of the vessel for latching the bar and associated lid over the opening, the other end of the spindle having a threaded portion, and a hub having a threaded bore extending therethrough and matingly receiving at least a portion of the threaded portion of the spindle therewithin, the hub being rotatable to cause the spindle to be displaced longitudinally within the threaded bore by virtue of the action of the mating threads of the bore and spindle to displace the hook element relative to the catch for latching or unlatching the bar and associated lid over the opening of the vessel; and, adjustment means carried on the spindle along a portion thereof between the bar and the hook element for adjusting the tightening force capable of application to the bar and lid on rotation of the hub, the adjustment means comprising an annular sleeve carried on the spindle and movable thereby and means carried by the sleeve for fastening the sleeve to the spindle in a predetermined location.

20. The apparatus of claim 19 wherein the adjustment means further comprise:

an annular adjustment nut carried by the sleeve;

means formed on the nut and on the sleeve for adjusting the position of the nut relative to the sleeve; and, means carried by the nut for fastening the nut to the sleeve in a predetermined location.

21. The apparatus of claim 19 wherein the hub is provided with at least one slot in an exterior wall thereof and wherein the apparatus further comprises locking means carried by the bar and disposed adjacent to the hub for inhibiting rotation of the hub during the existence of hazardous pressure conditions within the pressure vessel, the locking means comprising:

a pin mounted for horizontal movement to engage a distal end of the pin within the slot to inhibit rotation of the hub; and, means engaging an anterior end of the pin for exerting pressure on the pin to displace said pin into engagement with the hub, the pressure exerting means being responsive to pressure conditions existing within the pressure vessel.

22. The apparatus of claim 21 wherein the distal end of the pin is beveled on one side to allow continued rotation of the hub in a direction effecting closure of the lid.

23. The apparatus of claim 21 and further comprising a spring mounted on the pin and engaging surfaces of the locking means to exert a force on the pin to bias the pin away from engagement with the hub on release of pressure exerted on the pin by the last-mentioned means.

24. Apparatus for securing a lid of a pressure vessel over an opening thereof, the pressure vessel having a catch located on the body of the vessel, comprising:

a bar pivotally connected at a first end to the vessel and engaging the lid at a location along the length of the bar; and, latching means carried on a second, free end of the bar for biasing the bar against the lid to force the lid into a secured position over the opening of the vessel, the latching means being capable of a canting motion relative to the bar, the latching means comprising an elongated spindle carried in and extending through a recess in the free end of the bar, the spindle terminating at one end in a hook element which is adapted to engage the catch on the body of the vessel for latching the bar and associated lid over the opening, the other end of the spindle having a threaded portion, and a hub having a threaded bore extending therethrough and matingly receiving at least a portion of the threaded portion of the spindle therewithin, the hub being rotatable to cause the spindle to be displaced longitudinally within the threaded bore by virtue of the action of the mating threads of the bore and spindle to displace the hook element relative to the catch for latching or unlatching the bar and associated lid over the opening of the vessel, the hub being provided with at least one slot in an exterior wall thereof; and, locking means carried by the bar and disposed adjacent to the hub for inhibiting the rotation of the hub during the existence of hazardous pressure conditions within the pressure vessel, the locking means comprising a pin mounted for horizontal movement to engage a distal end of the pin within the slot to inhibit rotation of the hub, and means engaging an anterior end of the pin for exerting pressure on the pin to displace said pin into engagement with the hub, the pressure exerting means being responsive to pressure conditions existing within the pressure vessel.

25. The apparatus of claim 24 wherein the distal end of the pin is beveled on one side to allow continued rotation of the hub in a direction effecting closure of the lid.

26. The apparatus of claim 24 and further comprising a spring mounted on the pin and engaging surfaces of the locking means to exert a force on the pin to bias the pin away from engagement with the hub on release of pressure exerted on the pin by the last-mentioned means.

27. The apparatus of claim 24 and further comprising adjustment means carried on the spindle along a portion thereof between the bar and the hook element for adjusting the tightening force capable of application to the bar and lid on rotation of the hub.

28. The apparatus of claim 27 wherein the adjustment means comprise:

an annular sleeve carried on the spindle and movable thereby; and, means carried by the sleeve for fastening the sleeve to the spindle in a predetermined location.

29. The apparatus of claim 28 wherein the adjustment means further comprise:

an annular adjustment nut carried by the sleeve;

means formed on the nut and on the sleeve for adjusting the position of the nut relative to the sleeve; and, means carried by the nut for fastening the nut to the sleeve in a predetermined location.

30. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secured position over the opening of the vessel, the latching means comprising an elongated spindle carried in and extending through a recess in the free end of the bar, the spindle terminating at one end in a hook element which engages the catch on the body of the vessel for latching the bar and associated lid over the opening, and a hub carried by the spindle at the other end of said spindle, and cooperating means formed on the spindle and on the hub for displacing the spindle relative to the hub on rotation of the hub to displace the hook element relative to the catch, thereby to latch or unlatch the bar and associated lid over the opening of the vessel, the hub being provided with at least one slot in an exterior wall thereof; and, locking means carried by the bar and disposed adjacent to the hub for inhibiting the rotation of the hub during the existence of hazardous pressure conditions within the pressure vessel, the locking means comprising a pin mounted for horizontal movement to engage a distal end of the pin within the slot to inhibit rotation of the hub, and means engaging an anterior end of the pin for exerting pressure on the pin to displace said pin into engagement with the hub, the pressure exerting means being responsive to pressure conditions existing within the pressure vessel.

31. The apparatus of claim 30 wherein the distal end of the pin is beveled on one side to allow continued rotation of the hub in a direction effecting closure of the lid.

32. The apparatus of claim 30 and further comprising a spring mounted on the pin and engaging surfaces of the locking means to exert a force on the pin to bias the pin away from engagement with the hub on release of the pressure exerted on the pin by the last-mentioned means.

33. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secured position over the opening of the vessel, the latching means comprising an elongated spindle carried in and extending through a recess in the free end of the bar, the spindle terminating at one end in a hook element which engages the catch on the body of the vessel for latching the bar and associated lid over the opening, and a hub carried by the spindle at the other end of said spindle, and cooperating means formed on the spindle and on the hub for displacing the spindle relative to the hub on rotation of the hub to displace the hook element relative to the catch, thereby to latch or unlatch the bar and associated lid over the opening of the vessel, the hub being provided with at least one slot in an exterior wall thereof; and, locking means carried by the pressure vessel and disposed adjacent to the hub for inhibiting the rotation of the hub during the existence of hazardous pressure conditions within the pressure vessel, the locking means comprising a pin mounted for horizontal movement to engage a distal end of the pin within the slot to inhibit rotation of the hub, and means engaging an anterior end of the pin for exerting pressure on the pin to displace said pin into engagement with the hub, the pressure exerting means being responsive to pressure conditions existing within the pressure vessel.

34. The apparatus of claim 33 wherein the distal end of the pin is beveled on one side to allow continued rotation of the hub in a direction effecting closure of the lid.

35. The apparatus of claim 33 and further comprising a spring mounted on the pin and engaging surfaces of the locking means to exert a force on the pin to bias the pin away from engagement with the hub on release of pressure exerted on the pin by the last-mentioned means.

36. The apparatus of claim 1 and further comprising means for pivotally mounting the bar to the lid at said location along the length of the bar.

37. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secure position over the opening of the vessel, a portion of the latching means engaging the catch on the body of the vessel for latching the bar and associated lid over the opening;

adjustment means carried by the latching means along a portion thereof for adjusting tightening force applied to the bar and lid by the latching means; and, means for mounting the latching means to the bar for canting motion relative to the bar.

38. Apparatus for securing a lid of a pressure vessel over an opening thereof, the pressure vessel having a catch located on the body of the vessel, comprising:

a bar pivotally connected at a first end to the vessel and engaging the lid at a location along the length of the bar;

latching means carried on a second, free end of the bar for biasing the bar against the lid to force the lid into a secure position over the opening of the vessel, a portion of the latching means engaging the catch on the body of the vessel for latching the bar and associated lid over the opening, the latching means further comprising an elongated spindle carried in and extending through a recess in the free end of the bar, the spindle terminating at one end in a hook element comprising the catch-engaging portion, a hub mounted with the other end of the spindle, and cooperating means carried by the other end of the spindle and the hub for displacing the spindle and the hook element relative to the catch to latch or unlatch the bar and associated lid over the opening of the vessel; and, adjustment means carried by the latching means along a portion thereof for adjusting tightening force applied to the bar and lid by the latching means.

39. The apparatus of claim 38 wherein the adjustment means comprise:

an annular sleeve carried by the spindle and movable thereby; and, means carried by the sleeve for fastening the sleeve to the spindle in a predetermined location.

40. The apparatus of claim 39 wherein the adjustment means further comprise:

an annular adjustment nut carried by the sleeve;

means formed on the nut and on the sleeve for adjusting the position of the nut relative to the sleeve; and, means carried by the nut for fastening the nut to the sleeve in a predetermined location.

* * * * *